(12) United States Patent
Imrem et al.

(10) Patent No.: US 11,870,799 B1
(45) Date of Patent: Jan. 9, 2024

(54) APPARATUS AND METHOD FOR IMPLEMENTING A RECOMMENDED CYBER-ATTACK SECURITY ACTION

(71) Applicant: Second Sight Data Discovery, Inc., Bloomington, IN (US)

(72) Inventors: David Imrem, Bloomington, IN (US); Reuben Vandeventer, Bloomington, IN (US)

(73) Assignee: Second Sight Data Discovery, Inc.

( * ) Notice: Subject to any disclaimer, the term of this patent is extended or adjusted under 35 U.S.C. 154(b) by 0 days.

(21) Appl. No.: 17/963,855

(22) Filed: Oct. 11, 2022

(51) Int. Cl.
*H04L 9/40* (2022.01)

(52) U.S. Cl.
CPC ........ *H04L 63/1433* (2013.01); *H04L 63/102* (2013.01)

(58) Field of Classification Search
CPC ........... H04L 29/06904; H04L 63/1433; H04L 63/102
See application file for complete search history.

(56) References Cited

U.S. PATENT DOCUMENTS

| | | | |
|---|---|---|---|
| 9,930,061 B2 | 3/2018 | Zandani | |
| 10,050,989 B2 * | 8/2018 | Ng | H04L 63/1433 |
| 10,102,570 B1 * | 10/2018 | Kapczynski | G06Q 40/02 |
| 10,298,608 B2 * | 5/2019 | Knapp | G06F 21/577 |
| 10,599,877 B2 * | 3/2020 | Lam | G06F 21/6245 |
| 10,791,137 B2 | 9/2020 | Chawla | |
| 11,122,073 B1 * | 9/2021 | Cai | G06F 21/577 |
| 11,140,193 B2 | 10/2021 | Patel | |
| 11,258,817 B2 * | 2/2022 | Sheridan | H04L 63/20 |
| 11,568,455 B2 * | 1/2023 | Hogg | G06Q 30/0641 |
| 2004/0064543 A1 * | 4/2004 | Ashutosh | H04L 69/329 709/224 |
| 2006/0048209 A1 * | 3/2006 | Shelest | H04L 9/40 726/1 |
| 2006/0156407 A1 * | 7/2006 | Cummins | G06F 21/55 726/25 |
| 2009/0038011 A1 * | 2/2009 | Nadathur | G06F 21/565 707/999.2 |
| 2013/0227697 A1 * | 8/2013 | Zandani | G06F 21/57 726/25 |

(Continued)

OTHER PUBLICATIONS

Legg, Philip A., et al. "Automated insider threat detection system using user and role-based profile assessment." IEEE Systems Journal 11.2 (2015): 503-512. (Year: 2015).*

(Continued)

*Primary Examiner* — Jung W Kim
*Assistant Examiner* — Sameera Wickramasuriya
(74) *Attorney, Agent, or Firm* — Caldwell Intellectual Property Law

(57) ABSTRACT

An apparatus and method for determining a recommended cyber-attack security action are provided. The apparatus includes a processor and a memory communicatively coupled to the at least a processor. The memory contains instructions configuring the at least a processor to receive a cyber profile associated with a digital environment. The processor is further configured to receive a risk profile associated with the cyber profile and determine at least one security action based on the risk profile. In addition, the processor is configured to generating a user interface data structure configured to display the determined at least one security action.

20 Claims, 6 Drawing Sheets

(56) References Cited

U.S. PATENT DOCUMENTS

| | | | | |
|---|---|---|---|---|
| 2013/0283336 | A1* | 10/2013 | Macy | G06F 21/577 |
| | | | | 726/1 |
| 2014/0259170 | A1* | 9/2014 | Amsler | H04L 63/1408 |
| | | | | 726/23 |
| 2016/0164892 | A1* | 6/2016 | Satish | H04L 63/0236 |
| | | | | 726/23 |
| 2016/0234247 | A1* | 8/2016 | Ng | G06Q 40/08 |
| 2016/0241561 | A1* | 8/2016 | Bubany | H04L 63/1433 |
| 2016/0248800 | A1* | 8/2016 | Ng | G06Q 40/06 |
| 2016/0359907 | A1* | 12/2016 | Lam | G06F 21/629 |
| 2017/0078322 | A1* | 3/2017 | Seiver | H04L 41/0853 |
| 2018/0146004 | A1* | 5/2018 | Belfiore, Jr. | G06F 21/577 |
| 2019/0207975 | A1* | 7/2019 | Wardman | H04L 63/1483 |
| 2019/0250893 | A1* | 8/2019 | Pandit | G06N 20/00 |
| 2021/0117921 | A1* | 4/2021 | Kaidi | G06Q 20/382 |
| 2022/0021697 | A1* | 1/2022 | Adamson | H04L 63/20 |
| 2022/0086194 | A1* | 3/2022 | Adamson | H04L 63/0227 |
| 2022/0353276 | A1* | 11/2022 | Hegrat | G06N 5/04 |

OTHER PUBLICATIONS

Ugwoke, F. N., K. C. Okafor, and V. C. Chijindu. "Security QoS profiling against cyber terrorism in airport network systems." 2015 International Conference on Cyberspace (CYBER-Abuja). IEEE, 2015. (Year: 2015).*

B. Genge, P. Haller and I. Kiss, "Cyber-Security-Aware Network Design of Industrial Control Systems," in IEEE Systems Journal, vol. 11, No. 3, pp. 1373-1384, Sep. 2017, doi: 10.1109/JSYST.2015.2462715. (Year: 2017).*

* cited by examiner

APPARATUS AND METHOD FOR IMPLEMENTING A RECOMMENDED CYBER-ATTACK SECURITY ACTION

FIELD OF THE INVENTION

The present invention generally relates to the field of cyber security. In particular, the present invention is directed to an apparatus and method for implementing a recommended cyber-attack security action.

BACKGROUND

In recent years, cyber security has become increasingly important as much of the world's information is stored digitally. Modern cyber security solutions include a wide array of variables to account for to ensure networks and highly sensitive data are secure. Sorting through the wide array of variables is time consuming and may not detect all areas that may need to be addressed. It is also difficult to identify specific actions that may need to be taken to address parts of a network that may be vulnerable to a cyber-attack using the wide array of variables. Further, it is difficult and inefficient to make any suggested changes to the cyber security solutions. As such, modern cyber security solutions are inefficient and can be improved.

SUMMARY OF THE DISCLOSURE

In an aspect, an apparatus for implementing a recommended cyber-attack security action is provided. The apparatus includes a processor and a memory communicatively coupled to the at least a processor. The memory contains instructions configuring the at least a processor to receive a cyber profile associated with a digital environment. The processor is further configured to receive a risk profile associated with the cyber profile and implement at least one security action in the digital environment based on the risk profile. In addition, the processor is configured to generate a user interface data structure configured to display the implemented at least one security action.

In another aspect, a method for determining a recommended cyber-attack security action is provided. The method includes receiving a cyber profile associated with a digital environment. The method further includes receiving a risk profile associated with the cyber profile and implement at least one security action in the digital environment based on the risk profile. In addition, the method includes generating a user interface data structure configured to display the implemented at least one security action.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for determining a recommended cyber-attack security action. In an embodiment, the generated at least one recommended cyber-attack security action for a digital environment can be used to improve a level of digital security for a digital environment.

Aspects of the present disclosure allow for efficient and accurate generation of a recommended cyber-attack security action associated with different digital environments. Exemplary embodiments illustrating aspects of the present disclosure are described below in the context of several specific examples.

Figure 1:
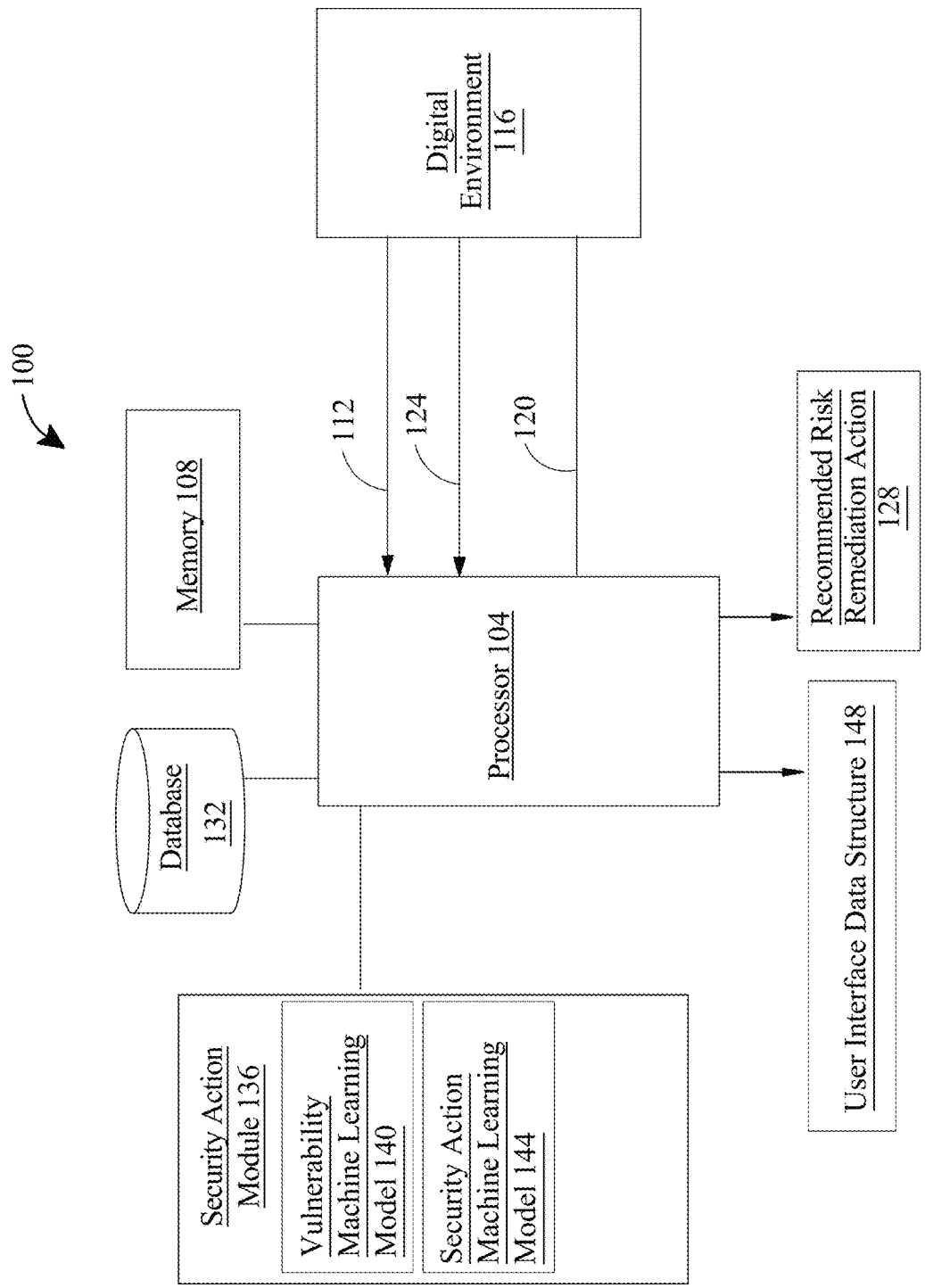
FIG. 1 is a block diagram of an apparatus for determining a risk associated with a cyber-attack.

Referring now to FIG. 1, an exemplary embodiment of an apparatus 100 for determining a risk associated with a cyber-attack is illustrated. System includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to, by memory 108, perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor 104 may further comprise and/or be included in a server. A server may include a computing device and/or a plurality of computing devices that provides functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with a digital environment through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus, or other relatively small geographic space), a telephone network, a data network associated with a telephone /voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

Still referring to FIG. 1, processor 104 is configured to receive a cyber profile 112 from a digital environment 116. A "digital environment," for the purpose of this disclosure is an integrated communications environment where digital devices communicate and manage data and interactions within the digital environment 116. Digital device may be any computing device as describe in this disclosure, for example as described in FIG. 6. For example, the digital environment 116 may be one of a computer system, computer network, and the like. In an exemplary embodiment, the digital environment 116 may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, the digital environment 116 may also include any electronically based asset associated with the digital environment 116. For example, electronically based assets may be computer programs, data, data stores, and the like, but are not limited to such examples. The digital environment 116 may be connected to the processor 104 by a network 120, as described in more above.

With continued reference to FIG. 1, the cyber profile 112 may be an input into the apparatus 100. As used in this disclosure, a "cyber profile" is a collection of digital data and/or information about digital assets associated with the digital environment. As used in this disclosure, a "digital asset" is any electronically based asset associated with and interconnected within the digital environment 116. For example, digital assets may include servers, databases, and computing main frames for the digital environment 116. In a further exemplary embodiment, digital assets may also include computer based programs, computer program data, and the like. Each digital asset may be connected by a communication network. The communication network may include a wide area network (e.g., the Internet, an enterprise network), a local area network (e.g., a network associated with an office, a building, a campus or other relatively small geographic space), a telephone network, a data network associated with a telephone /voice provider (e.g., a mobile communication provider data and/or voice network), a direct connection between two computing devices, and any combination thereof. A communication network may employ a wired and/or wireless mode of communication. Further, the digital environment 116 may employ any type of network architecture. For example, the digital environment 116 may employ a peer to peer (P2P) architecture where each computing device in a computing network is connected with every computing device in the network and every computing device acts as a server for the data stored in the computing device. In a further exemplary embodiment, the digital environment 116 may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the digital environment. Further, any network topology may be used. For example, the digital environment 116 may employ a mesh topology where a computing device is connected to one or multiple other computing devices using point to point connections. However, the network topology is not limited thereto. One skilled in the art will recognize the various network architectures that may be employed by the digital environment.

With further reference to FIG. 1, users may have permission to access digital assets within the digital environments. The digital assets may be accessed by users in a number of different ways. For example, the digital assets may be a software as a service (SaaS, thin-client computing device, thick client computing device, and the like. In other exemplary embodiments, a user may be required to use login credentials to access the digital assets. The login credentials may be any of login credentials at an organization level (e.g., all users for the organization use the same log in credentials) and/or individual log in credentials. One skilled in the art will recognize the various methods for user access to digital environments that may be employed by the digital environment 116. In an embodiment, at least a portion of each digital asset may also be installed on each user device associated with each user. In an exemplary embodiment, the digital assets may also be hosted on a central computing device to be accessed using user devices connected to the central server. Further, the digital environment 116 may employ one of a private network and a virtual private network (VPN) to establish a secure connection between the digital assets and the user.

Still referring to FIG. 1, the cyber profile 112 may include categories such as digital asset profile data associated with the digital environment. As used in this disclosure, "digital asset profile data" is specification data, program data, and the like for digital assets in digital environment 116. In an exemplary embodiment, the digital profile data may include a number of computer programs used in the digital environment 116, a number of computing devices. Further, the cyber profile 112 may be associated with a risk level. For example, a larger number of computer devices may indicate an increased risk level based on more areas of vulnerability to cyber-attack associated with more computing devices. The categories of the cyber profile 112 data may also include user data associated with the digital assets. As used in this disclosure, "user data" is any information and/or data related to user access within the digital environment 116. For example, the user data may include a number of users with access to a digital asset, identities of users with access to a digital asset, a level of access the users have to the digital asset, a type of access associated with the users, and the like. In an exemplary embodiment, users with a higher level and/or type of access (e.g., access to more digital assets, higher levels of access, and/or more secure digital assets) may indicate an increased risk level based on the increased access to the digital assets. In a further exemplary embodiment, users with a lower level and/or type of access (e.g., access to less digital assets, lower levels of access, and/or less secure digital assets) may indicate a decreased risk level based on the lesser access to the digital assets. Further, the categories of cyber profile 112 may also include protective asset data. As used in this disclosure, "protective asset data" is a collection of digital data and/or information about protective measures the digital environment may have in place to protect the digital assets. For example, protective asset data may include data about anti-malware applications, firewalls, access restrictions, security protocols, and the like. In an exemplary embodiment, protective asset data associated with an increased level of protective assets (e.g., higher firewall settings, access restrictions, and the like) may indicate a decreased risk level. In a further exemplary embodiment, protective asset data associated with a decreased level of protective assets (e.g., lower firewall settings, access restrictions, and the like) may indicate an increased risk level based on the lesser access to the digital assets.

With further reference to FIG. 1, the processor is configured to receive risk profile 124 from the digital environment 116. As used in this disclosure, "risk profile" is a collection of digital data and/or information associated with security of a digital environment 116. For example, the risk profile 124 may include categories such as cyber-attack protection data, degree of single points of failure data, cyber-attack recovery protocol data, and digital environment risk record, described in more detail below, but are not limited to such examples. One skilled in the art will recognize other categories of data that may be risk profile data 124.

Continuing to reference FIG. 1, "cyber-attack protection data" as used in this disclosure is data related to security measures in place for digital environment 116 to prevent a cyber-attack in an embodiment, cyber-attack protection data may include a number of users with access to the digital environment, a level of access for each user, security protocols, security protocol levels, and the like. For example, cyber-attack protection data may include digital data and/or information about protective measures and user restrictions implemented in the digital environment. As used in this disclosure, "degree of single points of failure data" is data indicating a level of failure associated with each digital asset in the event of a cyber-attack and/or failed operation of the digital asset. Further, the degree of single points of failure data may include impact of failure data. For example, impact of failure data may include data describing a level of failure of a digital environment based on different potential cyber-attacks and different potential points of failure in digital assets. In an embodiment, impact of failure data may include instances of when a point of failure may cause interruption on a small scale (e.g., at a department level, etc.), a medium scale (e.g., at an office level, etc.), and a large scale (e.g., at an entire company level, etc.). As used in this disclosure, "cyber-attack recovery protocol" is data indicating recovery measures in place that may be used for digital environment 116 to recover in the event of a cyber-attack. In addition, cyber-attack recovery protocol data may include data associated with the recovery of a digital environment after a potential cyber-attack. For example, cyber-attack recovery protocol data may include data about recovery protocols that may be used such as data backup information, an amount of time needed for digital assets to recover, and the like. In a non-limiting embodiment, the risk profile 124 may include a digital environment risk record. As used in this disclosure, "digital environment risk record" is data indicating a level of preparedness for preventing and resolving issues associated with a cyber-attack associated with the digital environment. The determined digital environment risk record may also include data indicating a probability of an adverse event on the digital environment (e.g., a cyber-attack or interruption to operation continuity of the digital environment). For instance and without limitation, the digital environment risk record may be consistent with digital environment risk record in U.S. patent application Ser. No. 17/963,805 and entitled, "APPARATUS AND METHOD FOR DETERMINING A RISK ASSOCIATED WITH A CYBER-ATTACK," which is incorporated by reference herein in its entirety.

With further reference to FIG. 1, the processor 104 is further configured to determine at least one recommended security action. As used in this disclosure, a "recommended security action" is an action to be performed in the digital environment to address areas with reduced security within the digital environment to reduce vulnerability to a cyber-attack. The vulnerability to cyber-attack may be related to an aspect of the cyber profile 112 and/or the risk profile 124 for digital environment 116. For example, the at least one recommended security action may include adding digital assets to the digital environment, changes to existing digital assets, changes to user settings and access to digital assets, changes to network protective asset, but are not limited thereto. The determining of the at least one recommended security action may include using the processor 104 to identify at least one area of vulnerability in the digital environment 116 based on at least one of the cyber profile 112 and the risk profile 124, and the at least one recommended security action may be determined based on the at least one area of vulnerability in the digital environment 116. In an embodiment, the at least one recommended security action may include a comprehensive list of all actions that may need to be implemented for the digital environment 116, a portion of the comprehensive list, and the like. For example, the list of vulnerabilities may be a recommended action for a digital asset may be susceptible to a cyber-attack compared to other digital assets, and the like. For example, the at least one recommended security action may be updating to a newer version of an operating system in a digital asset with increased security measures. The at least one recommended security action may be stored in a database 128 to maintain a history and/or a checklist of at least one recommended security action to ensure implementation of the at least one recommended security action. Database 128 is discussed in further detail below. For instance and without limitation, the recommended security action may be consistent with recommended risk remediation action in U.S. patent application Ser. No. 17/963,833 filed on Oct. 11, 2022 and entitled, "APPARATUS AND METHOD FOR DETERMINING A RECOMMENDED CYBER-ATTACK RISK REMEDIATION ACTION," which is incorporated by reference herein in its entirety.

With further reference to FIG. 1, the processor 104 is further configured to implement at least one security action in the digital environment. As used in this disclosure, "at least one security action" is a change to the digital environment 116 that can be used to improve a risk level associated with categories of data for the cyber profile 112 and the risk profile 124 for the digital environment 116. In an exemplary embodiment, the at least one security action may be determined, as described above, and/or retrieved from database 128 for implementation by the processer 104. For example, the at least one security action may include increasing a firewall level setting on a firewall for the digital environment 116. In an exemplary embodiment, the firewall level setting may be low, medium, or high, and the like. In another further example, the at least one security action may include installing an update to a software or operating system that may have improved security settings compared to the older version of the software or operating system. Additionally, the at least one security action may include adding digital assets to the digital environment, changes to existing digital assets, changes to user settings and/or access to digital assets, changes to network protective assets, but are not limited thereto. The processor 104 may communicate with any computing and/or user device operating within the digital environment 116 to implement the at least one security action using the communication network. In a further exemplary embodiment, the processor 104 may communicate via using the communication network with a central server within the digital environment 116 to implement the at least one security action across all user devices and/or digital assets within the digital environment 116.

Continuing to refer to FIG. 1, the processor 104 may be configured to implement the at least one security action 128 in the digital environment based on the risk profile 124. In an exemplary embodiment, the processor 104 may be configured to use any risk profile 124 data including at least one of the cyber-attack protection data, degree of single points of failure data, and cyber-attack recovery protocol data to identify an area of vulnerability, discussed in further detail below, to cyber-attack, determine at least one security action that targets and increases a security level of the area of vulnerability and implement the at least one security action to address the area of vulnerability. For example, the processor may receive cyber-attack recovery protocol data that indicates data has not been backed up, determine that backing up the data may increase security of the data, and communicate with a server in the digital environment to initiate backing up the data. In addition, the at least one security action may include adding digital assets to the digital environment, changes to existing digital assets, changes to user settings and access to digital assets, changes to network protective asset, but are not limited thereto. In a further example, the processor 104 may be configured to associate each of the cyber-attack protection data, degree of single points of failure data, and cyber-attack recovery protocol data with a risk level for cyber-attack, identify a security action that decreases the risk level for the cyber-attack protection data, degree of single points of failure data, and cyber-attack recovery protocol data, and implement the security action 128 intended to decrease the associated risk levels. The risk level may be an indication of a probability of an adverse event on the digital environment (e.g., a cyber-attack or interruption to operation continuity of the digital environment). In an embodiment, the risk level may include a ranking out of five stars, out of a scale of 1-10, a percentage score, and the like. For example, a digital environment with a risk level of "70" may be an indication the digital environment has an increased vulnerability to a cyber-attack than a digital environment with a risk level of "85." Further, the processor 104 may be configured to implement additional security actions to the at least one security action 128 based on additional risk profile 124 data.

Additionally, or alternatively, the processor 104 may be configured to implement the at least one security action 128 based on the cyber profile 112. In an exemplary embodiment, the processor 104 may be configured to use at least one of the digital asset data, user data associated with the digital assets, protective asset data, cyber-attack protection data, degree of single points of failure data, and cyber-attack recovery protocol data to determine the at least one security action 128. For example, the processor may receive user data for the digital assets that indicates too many users have unrestricted access to sensitive data, identify a security action for restricting access for some of these users because they do not need access to the sensitive data, and communicate with a server in the digital environment to initiate restricting access for users who do not use the sensitive data. Further, the processor 104 may be configured to associate each of the digital assets, protective asset data, cyber-attack protection data, cyber-attack protection data, degree of single points of failure data, and cyber-attack recovery protocol data with a risk level for cyber-attack and determine the at least one security action 128 based on the associated risk levels. Further, the processor 104 may be configured to implement additional security actions to the at least one security action 128 based on additional risk profile 124 data and cyber profile 112 data, as described above.

Continuing to reference FIG. 1, the processor 104 may use a machine learning module, such as security action module 136 to implement one or more algorithms or generate one or more machine-learning models, such as environment vulnerability machine learning model 140 and security action machine learning model 144, to determine the at least one recommended security action. However, the machine learning module is exemplary and may not be necessary to generate the one or more machine learning models and perform any machine learning described herein. In one or more embodiments, the one or more machine-learning models may be generated using training data. Training data may include inputs and corresponding predetermined outputs so that a machine-learning model may use the correlations between the provided exemplary inputs and outputs to develop an algorithm and/or relationship that then allows the machine-learning models to determine its own outputs for inputs. Training data may contain correlations that a machine-learning model may use to model relationships between two or more categories of data elements. The exemplary inputs and outputs may come from a database, such as any database described in this disclosure, or be provided by a user such as a digital environment administrator and/or a digital security administrator. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Security action module 136 may be used to generate environment vulnerability machine learning model 140 and security action machine learning model 144 using training data. Environment vulnerability machine learning model 140 and security action machine learning model 144 may be trained by correlated inputs and outputs of training data. Inputs of training data may include a plurality of data sets. Outputs of training data may include conversion, compiling, analyzing, and the like corresponding to the inputs. Training data may be data sets that have already been converted whether manually, by machine, or any other method. Training data may include previous outputs such that the one or more machine learning models iteratively produces outputs. The one or more machine learning models, using a machine-learning process, may output converted data based on input of training data.

In an embodiment, the implementing of the at least one security action 128 may include identifying at least one environment vulnerability based on at least one of the cyber profile 112 and risk profile 124 using a machine learning model, such as vulnerability machine learning model 140 generated by security action module 136. The vulnerability machine learning model 140 may be trained by training data, discussed in further detail below, such as vulnerability training data. Security action training data may be stored in a database 132. Database 132 is discussed in further detail below.

With continued reference to FIG. 1, the identifying of the at least one environment vulnerability using a machine learning model may include receiving vulnerability training data. In an embodiment, the vulnerability training data may include a plurality of risk profile 124 data and/or cyber profile 112 data that are each correlated to one of a plurality of digital environment vulnerability data. As used in this disclosure, "digital environment vulnerability data" is data describing areas of weakness or susceptibility to cyber-attacks within computer networks, computer systems, and the like. For example, digital environment vulnerability data may be data indicating an area of weakness for a digital environment is connected to a number of users with unrestricted access to sensitive data, a low level of a firewall setting for the digital environment, and the like. In an embodiment, the vulnerability training data may be used show how risk profile data may indicate a strength or weakness in the cyber security in the digital environment. In a further embodiment, the vulnerability training data may also include a plurality of cyber profile data that are each correlated to one of a plurality of digital environment vulnerability data. In such an embodiment, the vulnerability training data may be used show how cyber profile data may indicate a strength or weakness in the cyber security in the digital environment. The identifying of the at least one environment vulnerability using a machine learning model may further include training an environment vulnerability machine learning model as a function of the vulnerability training data. Further, the identifying of the at least one environment vulnerability using a machine learning model may also include identifying of the at least one environment vulnerability using the trained vulnerability machine learning model. Alternatively, or additionally, security action module 136 may use a vulnerability classifier to classify the digital asset data, user data associated with the digital assets, protective asset data, cyber-attack protection data, degree of single points of failure data, and cyber-attack recovery protocol data according to a type of digital environment vulnerability associated with the data. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as vulnerability training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\sum_{i=0}^{n} a_i^2}$ where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Vulnerability classifier may classify cyber profile data and risk profile to one or more types and/or category of resulting cyber-attack, which may include any type of cyber-attack, sub-categories and/or more specific categories, or the like. For instance, vulnerability classifier may receive cyber profile data and/or risk profile data with resulting cyber-attacks that occurred and may classify according to type of cyber-attack such as malware, denial-of-service, or the like. Vulnerability classifier may be trained using training data correlating cyber profile data and risk profiles in digital environments to a type of cyber-attack.

Continuing to reference FIG. 1, in an embodiment, the implementing of the at least one security action 128 may further include determining at least one security action that targets the area of vulnerability using a machine learning model, such as security action machine learning model 144 generated by security action module 136, based on at least one of the cyber profile 112 and risk profile 124. The security action machine learning model 144 may be trained by training data, discussed in further detail below, such as security action training data. Security action training data may be stored in a database 132. Database 132 is discussed in further detail below.

Still referring to FIG. 1, the implementing of the at least one security action 128 may further include determining at least one security action that targets and increases a security level of the area of vulnerability using a machine learning model. The determining of the at least one security action may include receiving security action training data. In an embodiment, the security action training data may include a plurality of risk profile 124 data and/or cyber profile 112 data that are each correlated to one of a plurality of security action data. As used in this disclosure, "security action data" is data describing actions and/or fixes implemented in digital environments to address areas of weakness or susceptibility to cyber-attack. For example, security action data may be data indicating a security action implemented can include restricting the number of users with unrestricted access to sensitive data, increasing a firewall level setting for a firewall in the digital environment, and the like. In an embodiment, the vulnerability training data may be used show security actions implemented in digital environments and the cyber profile 112 data and risk profile 124 data associated with the implementation of these security actions. The determining of the at least one security action using a machine learning model may further include training a security action machine learning model 144 as a function of the security action training data. Further, the determining of the at least one security action may also include determining the at least one security action using the trained security action machine learning model 144. In an exemplary embodiment, the security action machine learning model may receive data indicating a firewall for digital environment 116 is set at a specified level, recognize the specified level for the fire leaves the digital environment 116 vulnerable to certain cyber threats based on the security action training data, and determine the specified level for the firewall needs to be changed to an increased level of security to protect against the cyber threats. Alternatively, or additionally, a fuzzy inferencing system for determining of the at least one security action 128 may be employed, where any or all security actions may be represented as values and/or fuzzy sets for linguistic variables measuring the same, as described in more detail in FIG. 5. An inferencing system may use one or more fuzzy inferencing rules, as described below in FIG. 5, to output one or more linguistic variable values and/or defuzzified values indicating security actions overall or according to categories.

Still referring to FIG. 1, the processor 104 may be configured to determine a cyber profile category security action for each category of the cyber profile using the security action machine learning model 144 generated by security action module 136. As used in this disclosure, "cyber profile category security action" is a recommended action for preventing and resolving issues associated with a cyber-attack associated with a specific category of cyber profile data. According to an embodiment, each cyber profile category security action may be a security action of the at least one security action 128 to be implemented and may be any security action as described herein. In an embodiment, the categories of the cyber profile may be digital asset data, user data associated with the digital assets, and protective asset data, as described above, and the processor 104 may be configured to determine a cyber profile category security action for each category using the security action machine learning model 144. However, the processor 104 may be configured to determine a cyber profile category security action for any category of data associated with the cyber profile. The processor 104 may be configured to receive cyber profile category security action training data that correlates a plurality of cyber profile category data to each of a plurality of cyber profile category security actions implemented to remedy or strengthen a portion of the digital environment associated with the cyber profile category data, train the security action machine learning model 144 as a function of the cyber profile category security action training data, and determines a cyber profile category security action for each category of the cyber profile using the trained security action machine learning model 144. In an embodiment, the security action machine learning model 144 may be trained using cyber profile category security action training data to determine a relationship between an input of a plurality of cyber profile data and an output of a cyber profile category security action implemented based on the associated cyber profile data.

Continuing to refer to FIG. 1, the processor 104 may also be configured to determine a risk profile category security action for each category of the risk profile data using the security action machine learning model 144. As used in this disclosure, "risk profile category security action" is a recommended action for preventing and resolving issues associated with a cyber-attack for a specific category of risk profile data. In an embodiment, the processor 104 may be configured to determine a risk profile category risk remediation action for each category of the risk profile in addition to each of the cyber profile risk remediation actions described above. Further, the processor 104 may be configured to determine cyber profile category risk remediation actions and/or risk profile category risk remediation actions for any subset of categories for the cyber profile and risk profile. According to an embodiment, each risk profile security action may be a part of the security action 128 and may be any security action as described herein. In an embodiment, the categories of the risk profile data may be cyber-attack protection data, degree of single points of failure data, and cyber-attack recovery protocol data, as described above, and the processor 104 may be configured to determine a risk profile security action for the cyber-attack protection data, degree of single points of failure data, and cyber-attack recovery protocol data using the security action machine learning model 144. However, the processor may be configured to determine a risk profile security action for any category of data associated with the risk profile data. In an exemplary embodiment, for cyber-attack protection data, the processor 104 may receive data indicating a lower level of protection (e.g., lower firewall settings, greater user access, and the like) and determine a risk profile security action of increasing the firewall settings, decreasing user access, and the like. In a further exemplary embodiment, the processor 104 may receive data indicating a greater single point of failure (e.g., a larger portion of digital environment would lose functionality) and determine a risk profile security action of changing a network architecture to reduce an effect on the digital environment during an interruption of operation. In another further exemplary embodiment, the processor 104 may receive data indicating implementation of lower levels of cyber-attack recovery protocols (e.g., data is not backed up and cannot be recovered quickly, and the like) and determine a risk profile security action of creating back up files and/or implement quicker methods of data recovery.

With continued reference to FIG. 1, the processor 104 may be configured to receive risk profile security action training data that correlates a plurality of risk profile data to each of a plurality of risk profile security actions, train the security action machine learning model as a function of the risk profile security action training data, and determine a risk profile security action for each category of the risk profile data using the trained security action machine learning model 144. In an embodiment, the security action machine learning model 144 may be trained using risk profile category security action training data to determine a relationship between an input of a plurality of risk profile data and an output of a risk profile category security action implemented based on the associated risk profile data.

With further reference to FIG. 1, as described above, the processor 104 is configured to implement at least one of the cyber profile security action and/or risk profiled security action determine by the security action machine learning model 144 in the digital environment 116. The processor 104 may communicate with any computing and/or user device operating within the digital environment 116 to implement the at least one security action using the communication network. In a further exemplary embodiment, the processor 104 may communicate via using the communication network with a central server within the digital environment 116 to implement the at least one security action across all user devices and/or digital assets within the digital environment 116.

With continued reference to FIG. 1, the processor 104 may be configured to generate a user interface data structure 148 configured to display the implemented security action 128. As used in this disclosure, "user interface data structure" is a specialized formatting of data on a computer so that the information can be organized, processed, stored, and retrieved quickly and effectively for a user interface. The user interface data structure may allow the implemented security action 128 to be displayed on a display, graphical user interface, and the like. Display device may include, but is not limited to, a smartphone, tablet, laptop, monitor, tablet, and the like. Display device may include a separate device that includes a transparent screen configured to display computer generated images and/or information. The implemented security action 128 may be reviewed by a user, network administrator for the digital environment, and any other decisionmakers for the digital environment to gather information about security solutions implemented within for the digital environment 116 that may need to be monitored to continue to prevent and/or minimize the effects of a cyber-attack.

Still referring to FIG. 1, the processor 104 may be configured to receive an input from a user (e.g., network administrator for the digital environment and/or any other decisionmakers for the digital environment) via a user interface. As used in this disclosure, "user interface" is a point of human-computer interaction and communication in a device, such as apparatus 100. A "User input" as used in this disclosure is information received from an individual. User input may include, for instance and without limitation, information entered via text fields, information entered via clicking on icons of a graphical user interface (GUI), information entered via touch input received through one or more touch screens, and the like. In an embodiment, the processor 104 may be configured to receive a user selection of the at least one security action to be implemented. In a further exemplary embodiment, the processor 104 may generate a user interface data structure 148 that displays a plurality of determined security actions based on the cyber profile 112 and the risk profile 124 and a network administrator and/or any other decision-maker associated with the digital environment 116 may be able to select which of the plurality of determined security actions to implement within the digital environment 116 using the input device (e.g., user interface and the like). Additionally, the processor 104 may also be configured a user selection of cyber profile category security action and/or risk profile category security action to be implemented Continuing to refer to FIG. 1, the processor 104 may be configured to receive at least one digital environment constraint from a user (e.g., network administrator for the digital environment and/or any other decisionmakers for the digital environment) via the user interface. Further, the processor 104 may be configured to modify the at least one security action based on the at least one digital environment constraint. As used in this disclosure, "digital environment constraint" is a limiting property that affects implementation of potential security actions. For example, the at least one digital environment constraint may be a budget for any potential risk remediation actions, a time constraint, a digital asset constraint, but are not limited thereto. In an embodiment, the processor 104 may also be configured to determine the at least one digital environment constraint based on at least one of the cyber profile and the risk profile. For example, the processor 104 may analyze the cyber profile 112 data and the risk profile 124 data, determine the at least one security need to be implemented with urgency and modify the at least one security action to exclude any time-consuming security actions, such as implementing new servers, and the like.

With further reference to FIG. 1, processor 104 may be configured to determine a highest priority security action of the at least one security action to be implemented. Additionally, or alternatively, the processor 104 may be configured to determine a highest priority security action based on the at least one digital environment constraint. In some embodiments, processor 104 may be configured to solve at least an optimization problem, which may be an objective function, to determine a highest priority security action. An "objective function," as used in this disclosure, is a mathematical function with a solution set including a plurality of data elements to be compared. Processor 104 may compute a score, metric, ranking, or the like, associated with security action and select objectives to minimize and/or maximize the score/rank, depending on whether an optimal result is represented, respectively, by a minimal and/or maximal score; an objective function may be used by processor 104 to score each security action. At least an optimization problem may be based on one or more objectives, as described below. Processor 104 may determine a risk remediation action that optimizes the objective function based on the at least one digital environment risk constraint. In various embodiments solving at least an optimization problem may be based on a combination of one or more factors. Each factor may be assigned a score based on predetermined variables. In some embodiments, the assigned scores may be weighted or unweighted.

With continued reference to FIG. 1, solving at least an optimization problem may include performing a greedy algorithm process, where optimization is performed by minimizing and/or maximizing an output of objective function. A "greedy algorithm" is defined as an algorithm that selects locally optimal choices, which may or may not generate a globally optimal solution. For instance, processor 104 may select objectives so that scores associated therewith are the best score for each goal. For instance, in non-limiting illustrative example, optimization may determine the risk remediation action based on an the at least one digital environment risk constraint.

Still referring to FIG. 1, the optimization problem may be formulated as a linear objective function, which processor 104 may optimize using a linear program such as without limitation a mixed-integer program. A "linear program," as used in this disclosure, is a program that optimizes a linear objective function, given at least a constraint; a linear program maybe referred to without limitation as a "linear optimization" process and/or algorithm. For instance, in non-limiting illustrative examples, a given constraint might be a budget constraint associated with the digital environment, and a linear program may use a linear objective function to calculate a recommended remediation action based on the limit. In various embodiments, processor 104 may determine a set of risk remediation towards achieving a user's goal that maximizes digital security for the digital environment subject to a constraint. A mathematical solver may be implemented to solve for the set of instructions that maximizes scores; mathematical solver may be implemented on processor 104. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, processor 104 may assign variables relating to a set of parameters, which may correspond to the at least one digital environment risk constraint as described above, calculate an output of mathematical expression using the variables, and select an objective that produces an output that maximizes digital security levels for the digital environment. Selection of different loss functions may result in identification of different potential risk remediation actions as maximizing digital security levels.

Still referring to FIG. 1, the optimization problem may include, but is not limited to, continuous optimization, bound constrained optimization, constrained optimization, derivative-free optimization, discrete optimization, global optimization, and/or nondifferentiable optimization. The optimization function may include minimizing a loss function, where a "loss function" is an expression an output of which an optimization algorithm minimizes to generate an optimal result. As a non-limiting example, processor 104 may assign variables relating to a set of parameters, which may correspond to at least one digital environment risk constraint as described above, calculate an output of mathematical expression using the variables, and select an objective that produces an output that maximizes digital security levels for the digital environment. Selection of different loss functions may result in identification of different potential pairings as generating minimal outputs. The optimization problem may include a plurality of parameters. The plurality of parameters may include, but is not limited to, any of the at least one digital environment risk constraints as described above. In some embodiments, the optimization problem may maximize one or more parameters. In some embodiments, the optimization problem may minimize one or more parameters. In some embodiments, the optimization problem may include one or more constraints that may be placed on one or more parameters. In a non-limiting example, a constraint may be placed on a budget for the at least one recommended risk remediation action. In another non-limiting example, a constraint may be placed on a time available for implementation of the at least one recommended risk remediation action. In some embodiments, the optimization problem may minimize resources necessary (e.g. time and money) and/or other parameters. In other embodiments, the optimization problem may maximize parameters such as, but not limited to, digital security levels for the digital environment.

With continued reference to FIG. 1, the optimization problem may predict at least one recommended risk remediation action with the highest priority based on minimization of resource consumption. In a non-limiting example, the optimization problem may predict at least one recommended risk remediation action that needs urgent attention. In such an example, other parameters may be at non-optimal values that may allow for the recommended risk remediation action to be addressed immediately. In such an example, the other parameters may be optimized second to the minimization of resource consumption. In some embodiments, one or more parameters may be weighted. The weight of the parameters may include an emphasis on certain parameters, such as, but not limited to, resources consumption and/or time constraints. In other embodiments, other parameters may be weighted which may allow said parameters to more heavily influence the optimization problem and the recommended remediation action.

In a further embodiment, cyber profile category data and risk assessment category data and/or types of business entities may be classified to categories or cohorts of cyber profile category data and risk assessment category data and/or types of business entities, for which digital environment constraints may be stored and/or determined using further machine-learning methods for the optimization problem. For example, the digital environment 116 may be associated and/or classified into a category for digital environments with similar risk assessment category data and the cyber profile data. In a further exemplary embodiment, the digital environment 116 may be associated and/or classified with other digital environments in the same field of operation, for example medical insurance companies, and the like. The database 132 may also store data about the digital environment constraints for each of these categories and/or fields of operation. Additionally, or alternatively, a machine learning model may be used to determine the relative importance of each of the categories of risk assessment category data and the cyber profile data for each of these categories and/or fields of operation.

Figure 2:
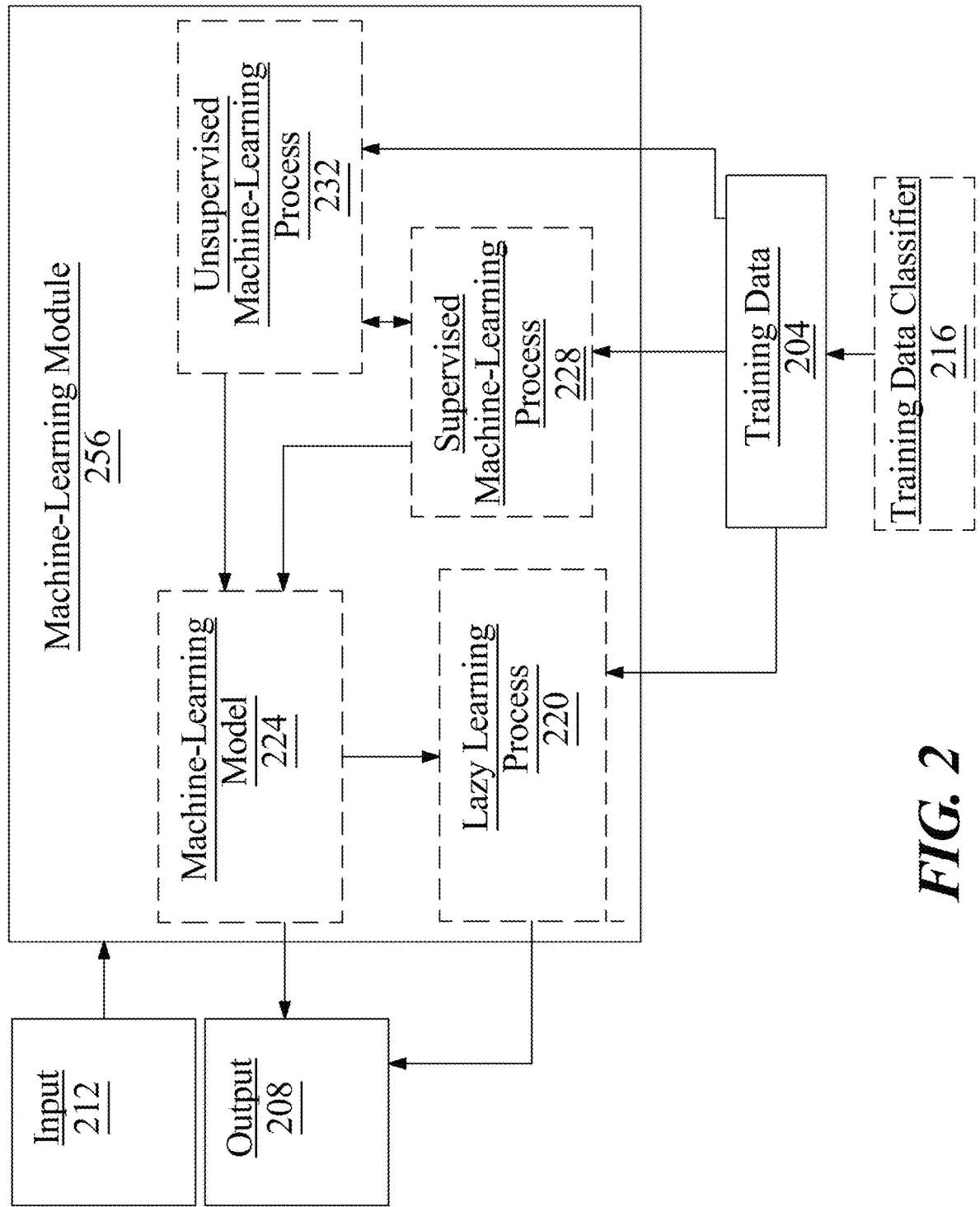
FIG. 2 is an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a user profile may be an input and a predictive quantifier may be an output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of total cryptographic capital return for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg- Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
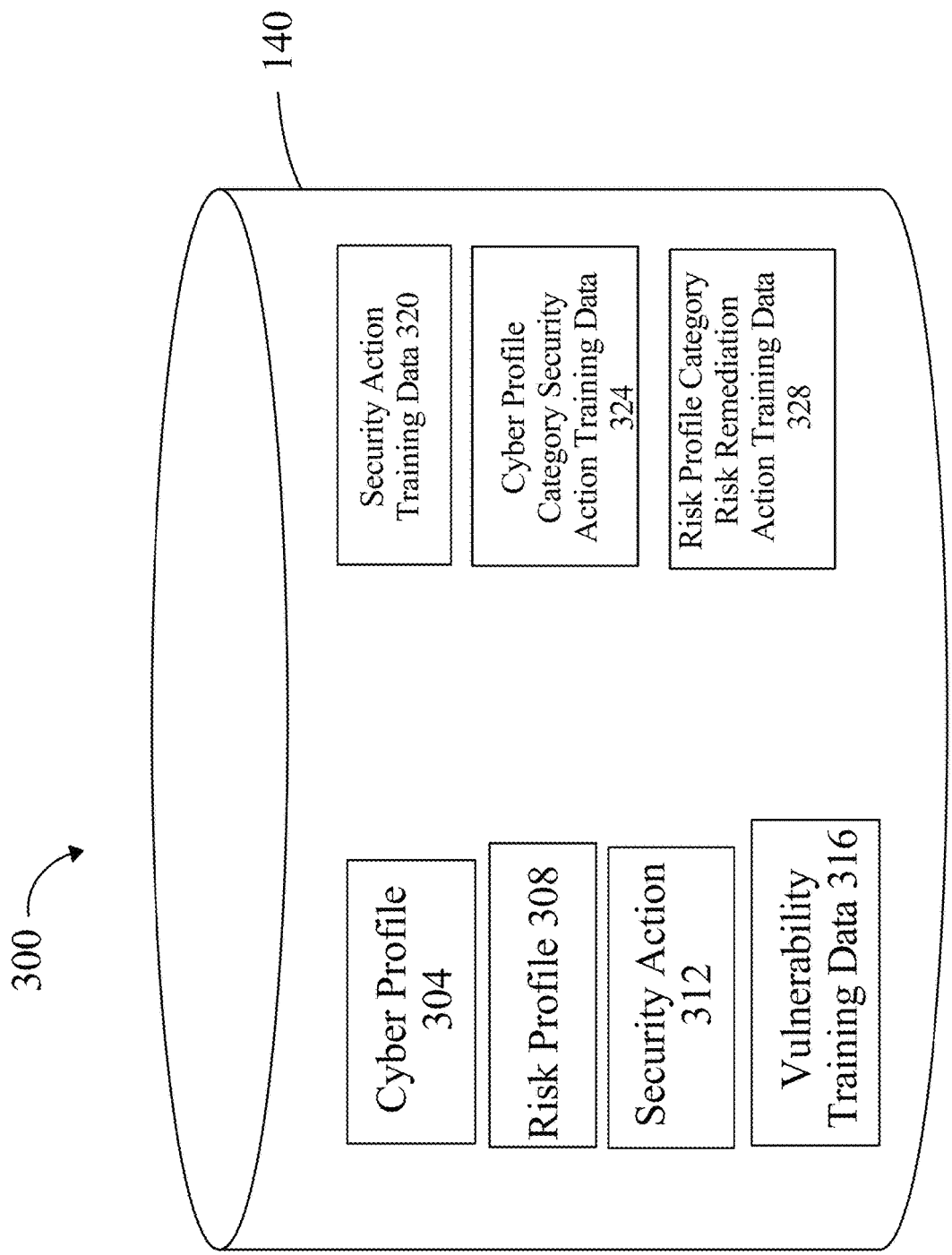
FIG. 3 is an exemplary embodiment of a database.

Now referencing FIG. 3, an exemplary embodiment 300 of database 132 is shown. Database 132 may be implemented, without limitation, as a relational database, a key-value retrieval database such as a NOSQL database, or any other format or structure for use as a database that a person skilled in the art would recognize as suitable upon review of the entirety of this disclosure. A key-value retrieval database may include any key such as voice activation. Database 132 may alternatively or additionally be implemented using a distributed data storage protocol and/or data structure, such as a distributed hash table or the like. Database 132 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Database 132 may be used to store cyber profile 304, risk profile data 308, security action 312, security action training data 316, cyber profile category security action training data 320, risk profile security action training data 324, and the like. Cyber profile 304 may be consistent with any cyber profiles as discussed above. Risk profile 308 may be consistent with any risk profile data as discussed herein. Security action 312 may be consistent with any security action as discussed herein. Security action training data 316, cyber profile category security action training data 320, risk profile security action training data 324 may be consistent with any training data as discussed herein.

Figure 4:
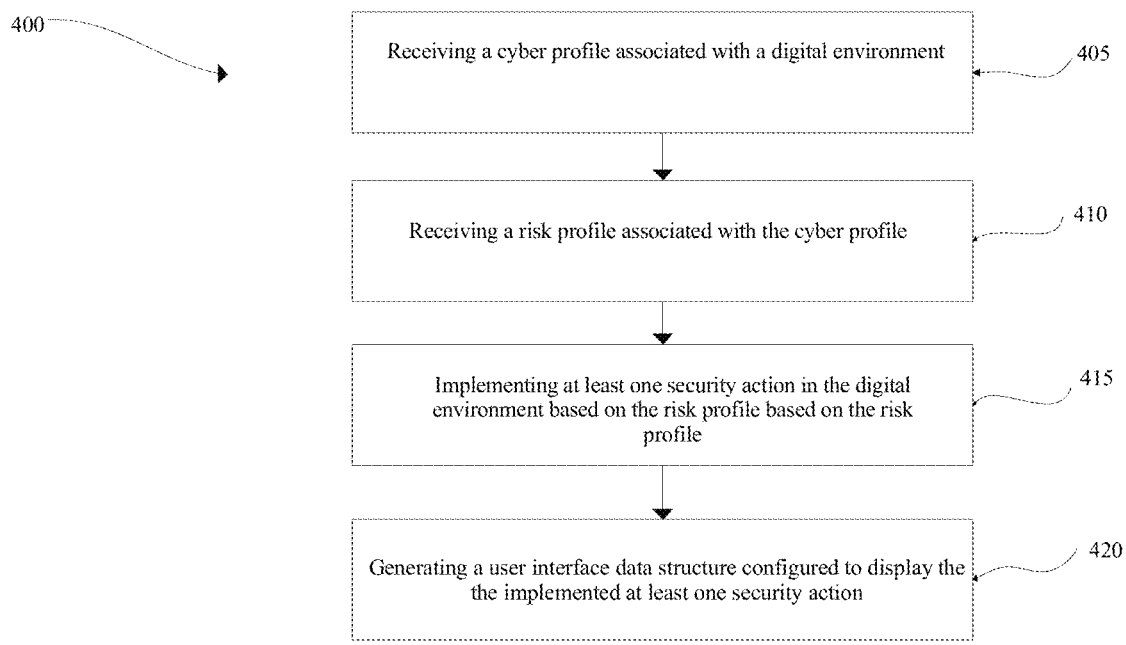
FIG. 4 is a flow diagram illustrating a method of determining a risk associated with a cyber-attack.

Referring now to FIG. 4, an exemplary embodiment of method 400 for implementing a cyber-attack security action is shown. Step 405 of method 400 includes receiving a cyber profile associated with a digital environment. In an embodiment, the cyber profile may comprise digital asset data, user data, protective asset data associated with the digital environment. This may be implemented, without limitation, as described above in reference to FIGS. 1-3.

Still referring to FIG. 4, step 410 of method 400 includes receiving a risk profile associated with the cyber profile. In an embodiment, the risk profile may comprise cyber-attack protection data, degree of single points of failure data, cyber-attack recovery protocol data, and a digital environment risk record. This may be implemented, without limitation, as described above in reference to FIGS. 1-3.

With further reference to FIG. 4, step 415 of method 400 includes implementing at least one security action in the digital environment. Additionally, or alternatively, the implementing the at least one security action based on the cyber profile and the risk profile data. Further, the implementing at least one security action in the digital environment may comprise receiving security action training data comprising a plurality of risk profile data correlated to a plurality of security action data, training a security action machine learning model as a function of the security action training data, determining the at least one security action using the security action machine learning model, and implementing the at least one security action determined by the security action machine learning model. In a further embodiment, the method 400 may include determining, by the security action machine learning model, a cyber profile category security action for each category of the cyber profile. Further, the method 400 may also include determining, by the security action machine learning model, a risk profile category security action for each category of the risk profile. These may be implemented, without limitation, as described above in reference to FIGS. 1-3.

Continuing to reference FIG. 4, step 420 of method 400 includes generating a user interface data structure configured to display the configured to display the determined at least one security action. In an embodiment, the method 400 may include receiving, by the user interface, a user selection of the at least one security action to be implemented. Further, the method 400 may include receiving, by the user interface, a user selection of the cyber profile category security action to be implemented. Additionally, or alternatively, the method 400 may include receiving, by the user interface, a user selection of the risk profile category security action to be implemented. These may be implemented, without limitation, as described above in reference to FIGS. 1-3.

Still referring to FIG. 4, the method 400 may include determining, by the processor, a highest priority security action of the at least one security action to be implemented. This may be implemented, without limitation, as described above in reference to FIGS. 1-3.

Figure 5:
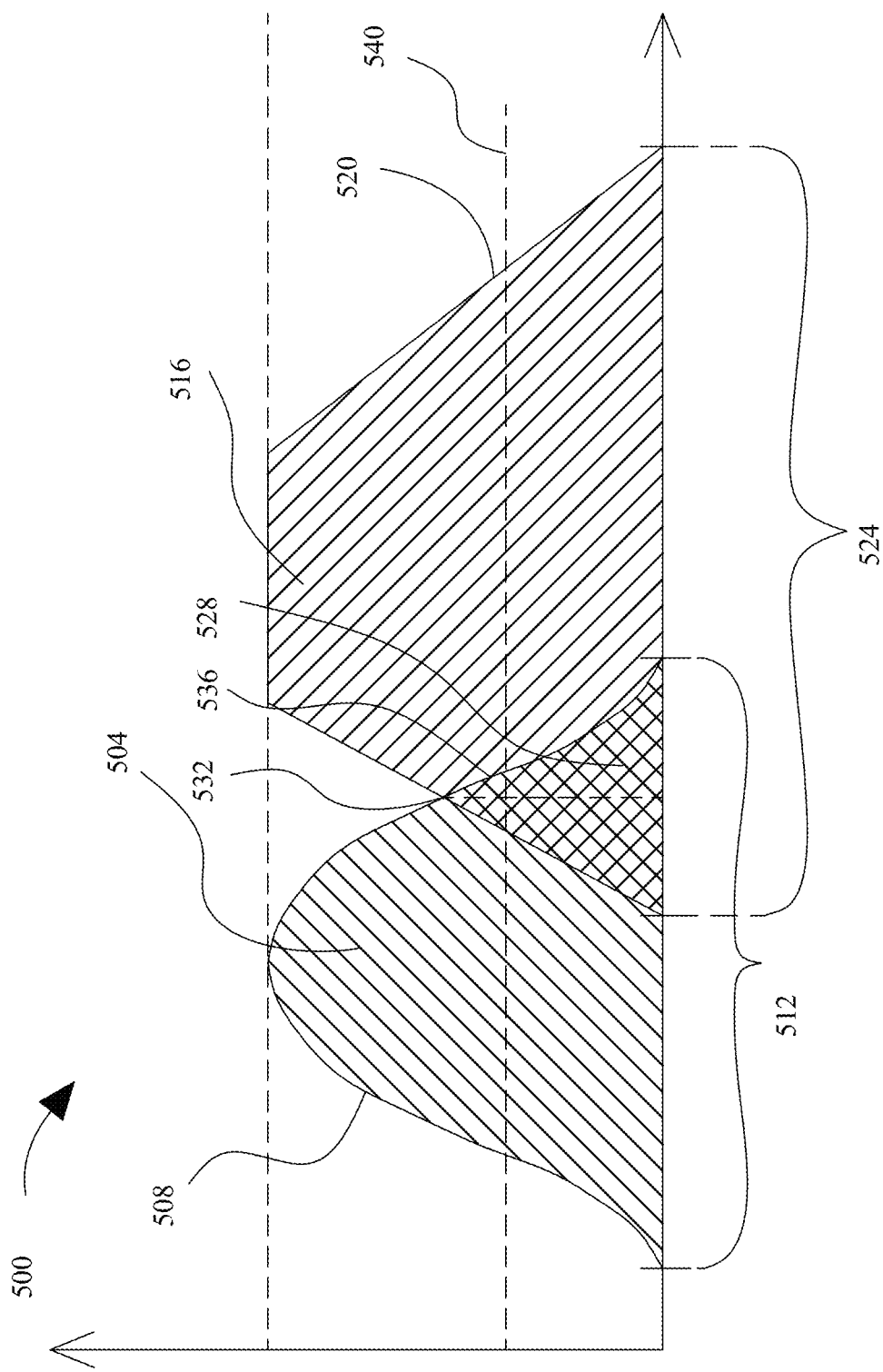
FIG. 5 is a schematic diagram illustrating an exemplary embodiment of a fuzzy inferencing system.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 562 representing a probability, as defined on probability interval, of a match between first fuzzy set 504 and second fuzzy set 516. Alternatively, or additionally, a single value of first and/or second fuzzy set may be located at a locus 566 on first range 512 and/or second range 524, where a probability of membership may be taken by evaluation of first membership function 508 and/or second membership function 520 at that range point. A probability at 528 and/or 562 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify cyber profile category risk data and risk assessment category data with security actions. For instance, if a cyber profile category risk datum has a fuzzy set matching security action fuzzy set by having a degree of overlap exceeding a threshold, processor 104 may classify the cyber profile category risk data and risk assessment category data as belonging to the security action categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, a cyber profile category risk datum may be compared to multiple security action categorization fuzzy sets. For instance, cyber profile category risk datum may be represented by a fuzzy set that is compared to each of the multiple security action categorization fuzzy sets; and a degree of overlap exceeding a threshold between the digital environment risk record fuzzy set and any of the multiple digital environment risk record categorization fuzzy sets may cause processor 104 to classify the cyber profile category risk datum as belonging to security action categorization. For instance, in one embodiment there may be two security action categorization fuzzy sets, representing respectively first security action categorization and second security action categorization. First security action categorization may have a first fuzzy set; Second security action categorization may have a second fuzzy set; and cyber profile category risk may have a cyber profile category risk fuzzy set. Processor 104, for example, may compare a cyber profile category risk fuzzy set with each of first security action categorization fuzzy set and second security action categorization fuzzy set, as described above, and classify the cyber profile category risk to either, both, or neither of first security action categorization nor second security action categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, a cyber profile category risk datum may be used indirectly to determine a fuzzy set, as a cyber profile category risk datum fuzzy set may be derived from outputs of one or more machine-learning models that take the cyber profile category risk datum directly or indirectly as inputs.

Still referring to FIG. 5, a computing device may use a logic comparison program, such as, but not limited to, a fuzzy logic model to determine a security action. A security action may include, but is not limited to, increase firewall settings, decrease user accessibility, and the like; each such security action may be represented as a value for a linguistic variable representing security action or in other words a fuzzy set as described above that corresponds to a degree of likelihood as calculated using any statistical, machine-learning, or other method that may occur to a person skilled in the art upon reviewing the entirety of this disclosure. In other words, a given element of user data may have a first non-zero value for membership in a first linguistic variable value such as "increase firewall settings" and a second non-zero value for membership in a second linguistic variable value such as "decrease user accessibility." In some embodiments, determining a security action categorization may include using a linear regression model. A linear regression model may include a machine learning model. A linear regression model may be configured to map data of digital environment risk record, such as user data to one or more digital environment risk record parameters. A linear regression model may be trained using a machine learning process. A linear regression model may map statistics such as, but not limited to, level of preparedness for cyber attack, a likelihood of cyber attack, and the like. In some embodiments, determining a security action may include using a security action classification model. A security action classification model may be configured to input collected data and cluster data to a centroid based on, but not limited to, frequency of appearance, linguistic indicators of quality, and the like. Centroids may include scores assigned to them such that cyber profile category risk data and any other data described above may each be assigned a security action. In some embodiments, cyber profile category risk model may include a K-means clustering model. In some embodiments, cyber profile category risk model may include a particle swarm optimization model. In some embodiments, determining the security action may include using a fuzzy inference engine. A fuzzy inference engine may be configured to map one or more security action data elements using fuzzy logic. In some embodiments, security action may be arranged by a logic comparison program into security action arrangements. A "security action arrangement" as used in this disclosure is any grouping of objects and/or data based on likelihood of cyber attack and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given security action level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. Continuing the example, an output linguistic variable may represent, without limitation, a score value. An inference engine may combine rules, such as: "if the protective asset level is 'high', the cyber profile category risk record is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
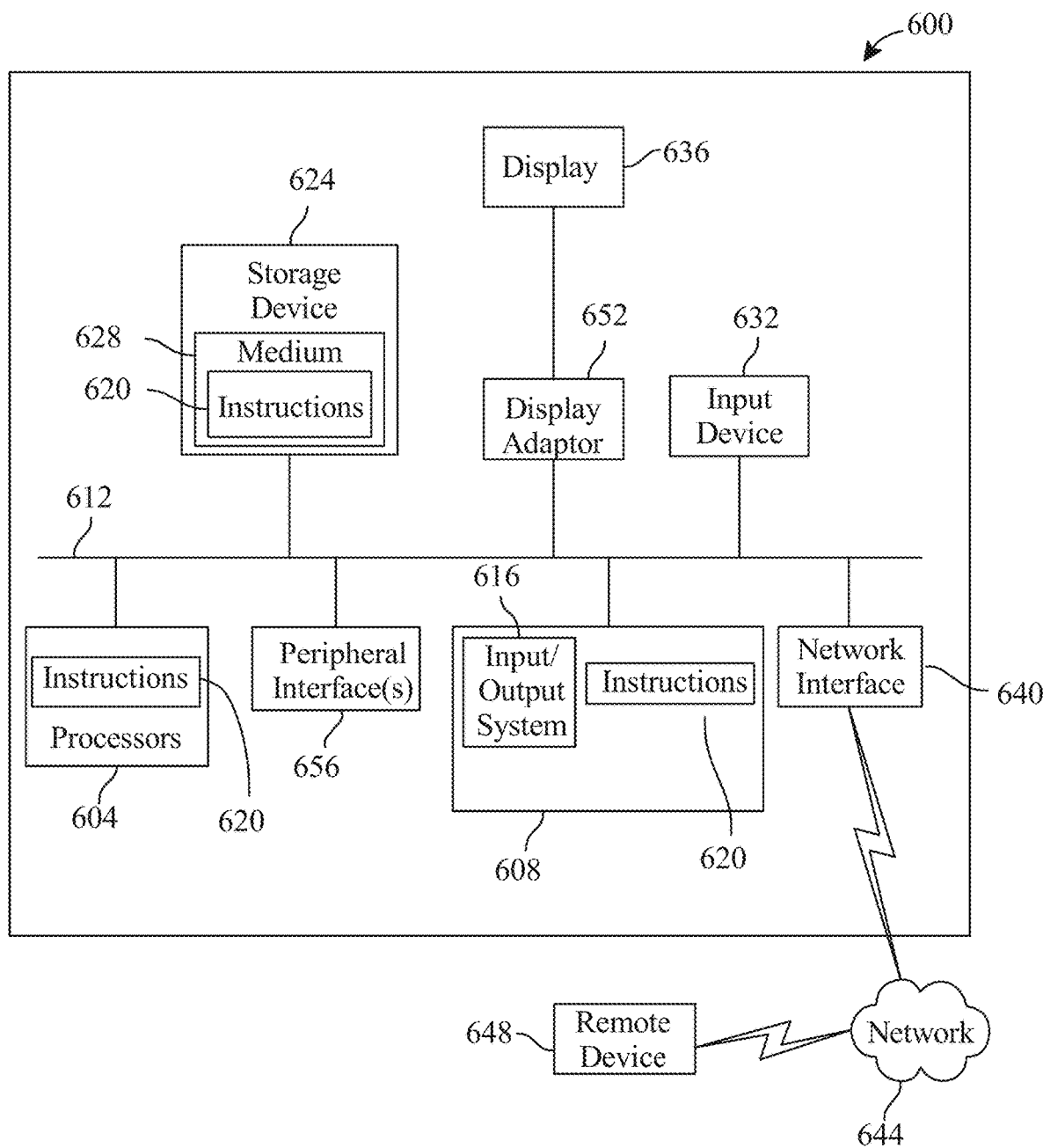
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for implementing a cyber-attack security action, the apparatus comprising:
   at least a processor; and
   a memory communicatively coupled to the at least a processor, the memory containing instructions configuring the at least a processor to:
   receive a cyber profile associated with a digital environment;
   receive a risk profile associated with the cyber profile;
   determine a plurality of security actions to be implemented in the digital environment based on the cyber profile and the risk profile, wherein the risk profile includes a single point of failure data;
   determine a highest priority security action of the plurality of security actions by optimization of an objective function, wherein optimizing the objective function comprises minimizing the objective function as a function of time available for implementation of at least a security action of the plurality of security actions;

implement the highest priority security action in the digital environment; and generate a user interface data structure configured to display the implemented security action on a user interface.

2. The apparatus of claim 1, wherein the cyber profile comprises digital asset profile data, user data, and protective asset data associated with the digital environment.

3. The apparatus of claim 1, wherein the risk profile comprises cyber-attack protection data, degree of single points of failure data, cyber-attack recovery protocol data, and a digital environment risk record.

4. The apparatus of claim 1, wherein implementing the highest priority security action further comprises:

receiving security action training data comprising a plurality of risk profile data correlated to a plurality of security action data;

training a security action machine learning model as a function of the security action training data;

determining the highest priority security action using the security action machine learning model; and implementing the highest priority security action determined by the security action machine learning model.

5. The apparatus of claim 4, wherein the security action machine learning model is configured to determine a cyber profile category security action for each category of the cyber profile.

6. The apparatus of claim 5, wherein the memory contains further instructions configuring the at least a processor to receive, by the user interface, a user selection of the cyber profile category security action to be implemented.

7. The apparatus of claim 4, wherein the security action machine learning model is configured to determine a risk profile category security action for each category of the risk profile.

8. The apparatus of claim 7, wherein the memory contains further instructions configuring the at least a processor to receive, by the user interface, a user selection of the risk profile category security action to be implemented.

9. The apparatus of claim 1, wherein the memory contains further instructions configuring the at least a processor to receive, by the user interface, a user selection of the at least one security action to be implemented.

10. The apparatus of claim 1, wherein the memory contains further instructions configuring the at least a processor to:

receive at least one digital environment constraint from a user via the user interface; and modify the highest priority security action based on the at least one digital environment constraint.

11. A method for implementing a cyber-attack security action, the method comprising:

receiving, by a processor, a cyber profile associated with a digital environment;

receiving, by the processor, a risk profile associated with the cyber profile;

determining, by the processor, a plurality of security actions to be implemented in the digital environment based on the cyber profile and the risk profile, wherein the risk profile includes a single point of failure data;

determining, by the processor, a highest priority security action of the plurality of security actions by optimization of an objective function, wherein optimizing the objective function comprises minimizing the objective function as a function of time available for implementation of at least a security action of the plurality of security actions;

implementing, by the processor, the highest priority security action in the digital environment; and generating, by the processor, a user interface data structure configured to display the implemented security action on a user interface.

12. The method of claim 11, wherein the cyber profile comprises digital asset profile data, user data, and protective asset data associated with the digital environment.

13. The method of claim 11, wherein the risk profile comprises cyber-attack protection data, degree of single points of failure data, cyber-attack recovery protocol data, and a digital environment risk record.

14. The method of claim 11, wherein implementing the highest priority security action further comprises:

receiving, by the processor, security action training data comprising a plurality of risk profile data correlated to a plurality of security action data;

training, by the processor, a security action machine learning model as a function of the security action training data;

determining, by the processor, the highest priority security action using the security action machine learning model; and implementing, by the processor, the highest priority security action determined by the security action machine learning model.

15. The method of claim 14, further comprising determining, by the security action machine learning model, a cyber profile category security action for each category of the cyber profile.

16. The method of claim 15, further comprising receiving, by the user interface, a user selection of the cyber profile category security action to be implemented.

17. The method of claim 14, further comprising determining, by the security action machine learning model, a risk profile category security action for each category of the risk profile.

18. The method of claim 17, further comprising receiving, by the user interface, a user selection of the risk profile category security action to be implemented.

19. The method of claim 11, further comprising receiving, by the user interface, a user selection of at least one security action to be implemented.

20. The method of clam 11, wherein the method further comprises:

receiving, by the processor, at least one digital environment constraint from a user via the user interface; and modifying, by the processor, the highest priority security action based on the at least one digital environment constraint.

* * * * *